United States Patent
Massie et al.

(10) Patent No.: US 8,350,412 B2
(45) Date of Patent: Jan. 8, 2013

(54) DYNAMICALLY CONTROLLING CONFIGURATION OF A POWER GRID COMPRISING ONE OR MORE STAND-ALONE SUB-GRIDS

(75) Inventors: Darrell D. Massie, Fort Montgomery, NY (US); Michael A. Miller, Shreveport, LA (US); Peter S. Curtiss, Boulder, CO (US)

(73) Assignee: Intelligent Power and Engineering Research Corporation (IPERC), Fort Montgomery, NY (US)

( * ) Notice: Subject to any disclaimer, the term of this patent is extended or adjusted under 35 U.S.C. 154(b) by 309 days.

(21) Appl. No.: 12/817,645

(22) Filed: Jun. 17, 2010

(65) Prior Publication Data

US 2010/0320838 A1   Dec. 23, 2010

Related U.S. Application Data

(60) Provisional application No. 61/218,512, filed on Jun. 19, 2009.

(51) Int. Cl.
*H02J 7/00* (2006.01)
*H02J 9/00* (2006.01)

(52) U.S. Cl. .......... 307/65; 700/286; 700/293; 700/295; 700/296

(58) Field of Classification Search .................... 307/65, 307/57
See application file for complete search history.

(56) References Cited

U.S. PATENT DOCUMENTS

| | | | |
|---|---|---|---|
| 5,237,507 A | 8/1993 | Chasek | |
| 6,338,009 B1 * | 1/2002 | Sato et al. | 700/286 |
| 6,347,027 B1 | 2/2002 | Nelson et al. | |
| 6,486,569 B2 | 11/2002 | Couture | |
| 6,535,797 B1 | 3/2003 | Bowles et al. | |
| 6,866,527 B2 | 3/2005 | Potega | |
| 7,231,280 B2 | 6/2007 | Costa | |
| 7,278,120 B2 | 10/2007 | Rahmat et al. | |
| 7,430,459 B1 | 9/2008 | Papalia et al. | |
| 7,478,416 B2 | 1/2009 | Edson | |
| 7,590,472 B2 | 9/2009 | Hakim et al. | |

(Continued)

OTHER PUBLICATIONS

International Search Report & Written Opinion of the International Searching Authority for PCT/US2010/038968, dated Jan. 20, 2011.
International Search Report & Written Opinion of the International Searching Authority for PCT/US2010/038974, dated Jan. 28, 2011.

*Primary Examiner* — Rexford Barnie
*Assistant Examiner* — Toan Vu
(74) *Attorney, Agent, or Firm* — Kevin P. Radigan, Esq.; Heslin Rothenberg Farley & Mesiti P.C.

(57) ABSTRACT

A technique is provided for automatically controlling configuration of a power grid, which includes one or more stand-alone sub-grids. Each stand-alone sub-grid includes a power generator, and a load is associated with the stand-alone sub-grid(s). The technique includes: monitoring the power grid by monitoring power demand of a load associated with the stand-alone sub-grid(s) and the power generated by the power generator within each stand-alone sub-grid; automatically determining that a grid configuration change is required for the power grid based on the monitoring; and dynamically reconfiguring the power grid by automatically modifying a number of stand-alone sub-grids in the power grid without interrupting power to the load associated with the stand-alone sub-grid(s) of the power grid. In one implementation, the power grid is a mobile power grid, and the power generator of each stand-alone sub-grid is a portable power generator.

21 Claims, 8 Drawing Sheets

U.S. PATENT DOCUMENTS

| | | |
|---|---|---|
| 2002/0167174 A1* | 11/2002 | Haass et al. .................... 290/1 A |
| 2004/0107273 A1 | 6/2004 | Biran et al. |
| 2005/0154701 A1 | 7/2005 | Parunak et al. |
| 2007/0124607 A1 | 5/2007 | Fuch |
| 2007/0239372 A1* | 10/2007 | Schweitzer ..................... 702/57 |
| 2008/0114499 A1 | 5/2008 | Hakim et al. |
| 2008/0238750 A1 | 10/2008 | Kris et al. |
| 2008/0281663 A1 | 11/2008 | Hakim et al. |
| 2009/0112375 A1 | 4/2009 | Popescu |
| 2009/0146497 A1 | 6/2009 | Taylor et al. |

* cited by examiner

DYNAMICALLY CONTROLLING CONFIGURATION OF A POWER GRID COMPRISING ONE OR MORE STAND-ALONE SUB-GRIDS

CROSS-REFERENCE TO RELATED APPLICATION

This application claims the benefit of U.S. Provisional Application No. 61/218,512, filed Jun. 19, 2009, which is hereby incorporated herein by reference in its entirety.

TECHNICAL FIELD

The present invention relates generally to the field of electrical power control, and more particularly, to a process for dynamically controlling configuration of a power grid comprising one or more stand-alone sub-grids by automatically setting electrical connections within or between the stand-alone sub-grids, e.g., to minimize fuel use.

BACKGROUND OF THE INVENTION

In small power grids, such as mobile power grids, the inability to synchronize small generators without creating undesirable system harmonics and grid instability has been a persistent problem for decades. Conventionally, synchronous transmissions are coordinated by an external clock signal. Whenever an electronic generator transmits digital (and sometimes analog) data to another electronic device, the voltage and frequency must be established between the two devices, that is, the receiving device must have some way of knowing, within the context of the fluctuating signal that it's receiving, where each unit of data begins and where it ends. While the synchronization of signals and devices can be achieved, the ability to maintain synchronization within acceptable electrical tolerances has proved difficult. The fundamental problem is one of physics. While electrical systems respond rapidly, a power generator's rotating machinery has inherent inertial forces, which makes for a much slower response. This mismatch leads to grid instability and undesirable transient effects when attempting to reconfigure a small, stand-alone power grid, which can trip relays and shut the grid down.

BRIEF SUMMARY OF THE INVENTION

The shortcomings of the prior art are overcome and additional advantages are provided through the provision of an automated method of controlling configuration of a power grid. The method includes: automatically monitoring the power grid, wherein the power grid comprises at least one stand-alone sub-grid, each stand-alone sub-grid comprising a power generator, and wherein the automatically monitoring comprises automatically monitoring power demand of a load associated with the at least one stand-alone sub-grid and power generated by the power generator within each stand-alone sub-grid; automatically determining that a grid configuration change is required for the power grid based on the monitoring; and dynamically reconfiguring the power grid by automatically modifying a number of stand-alone sub-grids in the power grid without interrupting power to the load associated with the at least one stand-alone sub-grid of the power grid.

In a further aspect, a method of controlling configuration of a power grid is provided. The method includes: automatically monitoring the power grid, wherein the power grid comprises at least one stand-alone sub-grid, each stand-alone sub-grid comprising a power generator, and wherein the automatically monitoring comprises automatically monitoring power demand of a load associated with the at least one stand-alone sub-grid and power generated by the power generator within each stand-alone sub-grid; automatically determining that a grid configuration change is required for the power grid based on the monitoring; automatically electrically connecting a first stand-alone sub-grid and a second stand-alone sub-grid of the at least one stand-alone sub-grid into a single stand-alone sub-grid and automatically deactivating at least one power generator of the first stand-alone sub-grid or the second stand-alone sub-grid, the automatically electrically connecting being responsive to the monitored load being below a lower power load threshold and occurring without interrupting power to the load associated with the at least one stand-alone sub-grid of the power grid; and automatically electrically separating the single stand-alone sub-grid of the at least one stand-alone sub-grid into the first stand-alone sub-grid and the second stand-alone sub-grid and automatically activating at least one additional power generator to power one of the first stand-alone sub-grid or the second stand-alone sub-grid, the automatically electrically separating being responsive to the monitored power load being or dynamically projected to be above a high power load threshold, and occurring without interrupting power to the load associated with the at least one stand-alone sub-grid of the power grid.

In another aspect, a system for controlling configuration of a power grid is provided. The system includes a memory, and a processor in communications with the memory. The system is capable of performing a method which includes: automatically monitoring the power grid, wherein the power grid comprises at least one stand-alone sub-grid, each stand-alone sub-grid comprising a power generator, and wherein the automatically monitoring comprises automatically monitoring power demand of a load associated with the at least one stand-alone sub-grid and power generated by the power generator within each stand-alone sub-grid; automatically determining that a grid configuration change is required for the power grid based on the monitoring; and dynamically reconfiguring the power grid by automatically modifying a number of stand-alone sub-grids in the power grid without interrupting power to the load associated with the at least one stand-alone sub-grid of the power grid.

In a further aspect, a computer program product is provided for controlling configuration of a power grid. The computer program product includes a storage medium readable by a processing circuit and storing instructions for execution by the processing circuit for performing a method which includes: automatically monitoring the power grid, wherein the power grid comprises at least one stand-alone sub-grid, each stand-alone sub-grid comprising a power generator, and wherein the automatically monitoring comprises automatically monitoring power demand of a load associated with the at least one stand-alone sub-grid and power generated by the power generator within each stand-alone sub-grid; automatically determining that a grid configuration change is required for the power grid based on the monitoring; and dynamically reconfiguring the power grid by automatically modifying a number of stand-alone sub-grids in the power grid without interrupting power to the load associated with the at least one stand-alone sub-grid of the power grid.

Additional features and advantages are realized through the techniques of the present invention. Other embodiments and aspects of the invention are described in detail herein and are considered part of a the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Generally stated, provided herein is a facility for automatically controlling configuration of a power grid comprising one or more stand-alone sub-grids by automatically, electrically connecting or separating stand-alone sub-grids, depending upon load requirements within the power grid, or sub-grids. Advantageously, the grid configuration control facility can be implemented to minimize fuel consumption of the one or more stand-alone sub-grids by allowing for deactivation of one or more power generators when less power is needed. This, in turn, minimizes power generator run time, thereby also reducing maintenance costs.

As used herein "power grid" refers to an electrically powered grid comprising at least one stand-alone sub-grid and an associated load. Each stand-alone sub-grid comprises at least one power source, such as a power generator, which in one example, is a portable generator. By way of specific example, the power grid may be a mobile power grid, such as a tactical power grid employed by an armed services unit.

Reference is made below to the drawings (which are not drawn to scale for ease of understanding), wherein the same reference numbers used throughout different figures designate the same or similar components.

Figure 1:
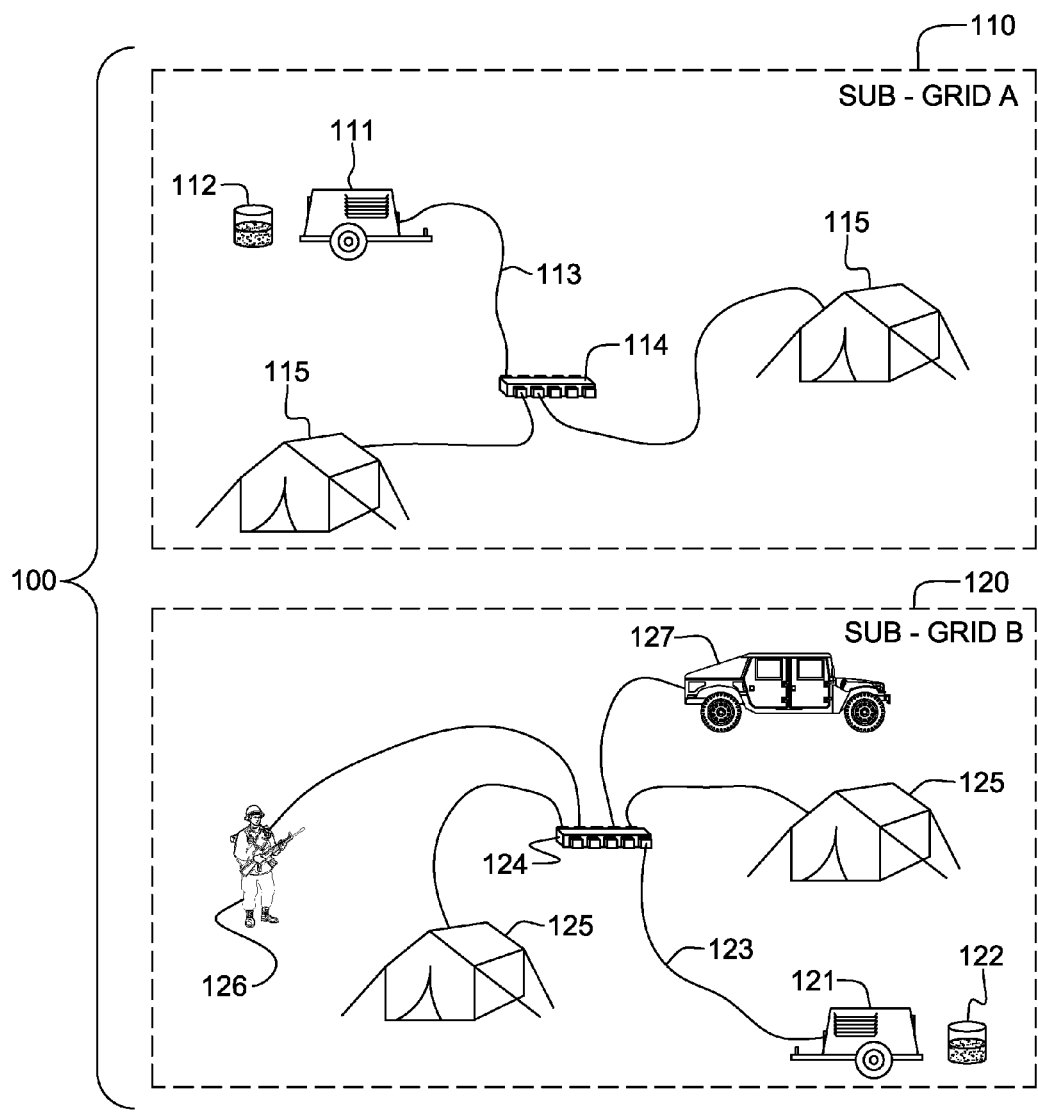
FIG. 1 illustrates one embodiment of a power grid configuration comprising two stand-alone sub-grids to be dynamically controlled, in accordance with an aspect of the present invention.

FIG. 1 depicts one embodiment of a power grid, generally denoted 100, comprising two stand-alone sub-grids, labeled sub-grid A 110 and sub-grid B 120. This figure depicts one example of a typical tactical power grid. As illustrated, stand-alone sub-grid A 110 includes a mobile power generator 111 with a fuel supply 112. Mobile power generator 111 is electrically connected via a main feeder line 113 to a power distribution unit 114, which essentially splits the power into multiple, breaker-protected distribution lines that supply power to any number of individual loads, such as individual environmental control units 115. Similarly, sub-grid B 120 includes a mobile power generator 121 and an associated fuel supply 122. Mobile power generator 121 supplies power via a main feeder line 123 to a power distribution unit 124, which splits the power into multiple, breaker-protected distribution lines for feeding the associated load. In this example, the load includes multiple environmental control units 125, one or more soldier-based recharging loads 126 and one or more mobile battery recharging loads 127. In one example, the mobile power generators 111, 121 are gasoline-powered electrical generators. However, the concepts described herein are not limited to such generators.

When two or more tactical forces are camped in the same geographic area, each is often powered by their own mobile generator and fuel supply, in a manner such as shown in FIG. 1. Over time, the individual loads for the sub-grids fluctuate significantly and the associated mobile generators operate over a wide range of their rated operating output power range. At higher loads, the generators are fairly efficient, but at low power loads, the mobile generators can be quite inefficient, which can lead to rapid depletion of fuel supplies.

Responsive to this, proposed herein is a control technique that allows the stand-alone sub-grids to be automatically electrically connected in such a way as to allow for the sharing of one or more mobile generators during periods of low loads, and to quickly and seamlessly, electrically disconnect the sub-grids during periods of high loads, or repositioning of any of the independent mobile sub-grids making up the power grid.

Figure 2:
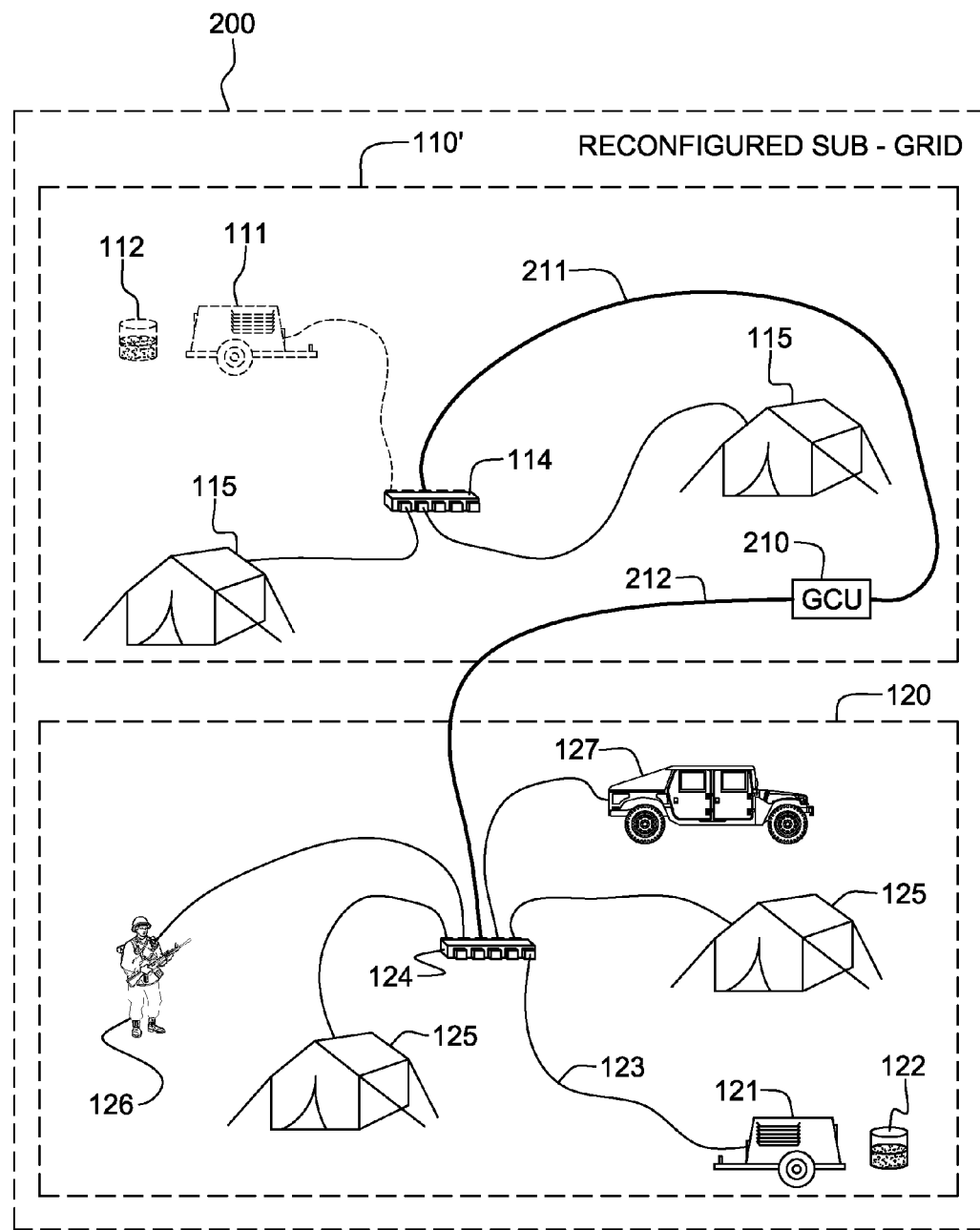
FIG. 2 illustrates one embodiment of a single stand-alone sub-grid reconfigured from the stand-alone sub-grids of FIG. 1, employing a grid configuration control facility, in accordance with an aspect of the present invention.

This concept is illustrated in FIG. 2, wherein a reconfigured, stand-alone sub-grid 200 is shown comprising the load from the first sub-grid 110' and comprising the second sub-grid 120. A grid connect unit (GCU) 210 is employed to selectively electrically connect the distribution power units 114, 124 (via connecting feeder lines 211, 212), as shown. Note that the sub-grids or the generators could be combined other than through the power distribution units, if desired. Grid connect unit 210 disclosed herein includes (in one embodiment) a power relay which allows for automated electrical connection of the two stand-alone sub-grids into a single, stand-alone sub-grid. Connection of the two stand-alone sub-grids can seamlessly occur when the grid voltage frequencies are synchronized within a small range, for example, about or equal to 60 Hz. Once the power load of sub-grid 110' is being supplied via mobile power generator 121, then mobile power generator 111 can be deactivated, saving its fuel supplies 112.

Various approaches are possible for determining when to connect and disconnect the stand-alone sub-grids. One approach is to employ a control system design wherein performance of the components within the sub-grid(s) is pre-characterized, and control algorithms are predefined and programmed based on rules into a controller for the power grid, or multiple controllers for the stand-alone sub-grids. For example, in this approach, whenever load of a power grid is below a low power load set point, the controller could dynamically combine a first sub-grid and a second sub-grid via the grid control unit so that the mobile power generator of one of the sub-grids may be deactivated. Similarly, whenever the monitored load of power grid, or of one or more of the sub-grids is above a high power load set point, then the controller could dynamically separate a single sub-grid into two or more stand-alone sub-grids by actuating the grid connect unit to electrically isolate, for example, the power distribution units 114, 124 of the sub-grids, and by activating one or more mobile power generators so that each sub-grid has its own power source.

Figure 3:
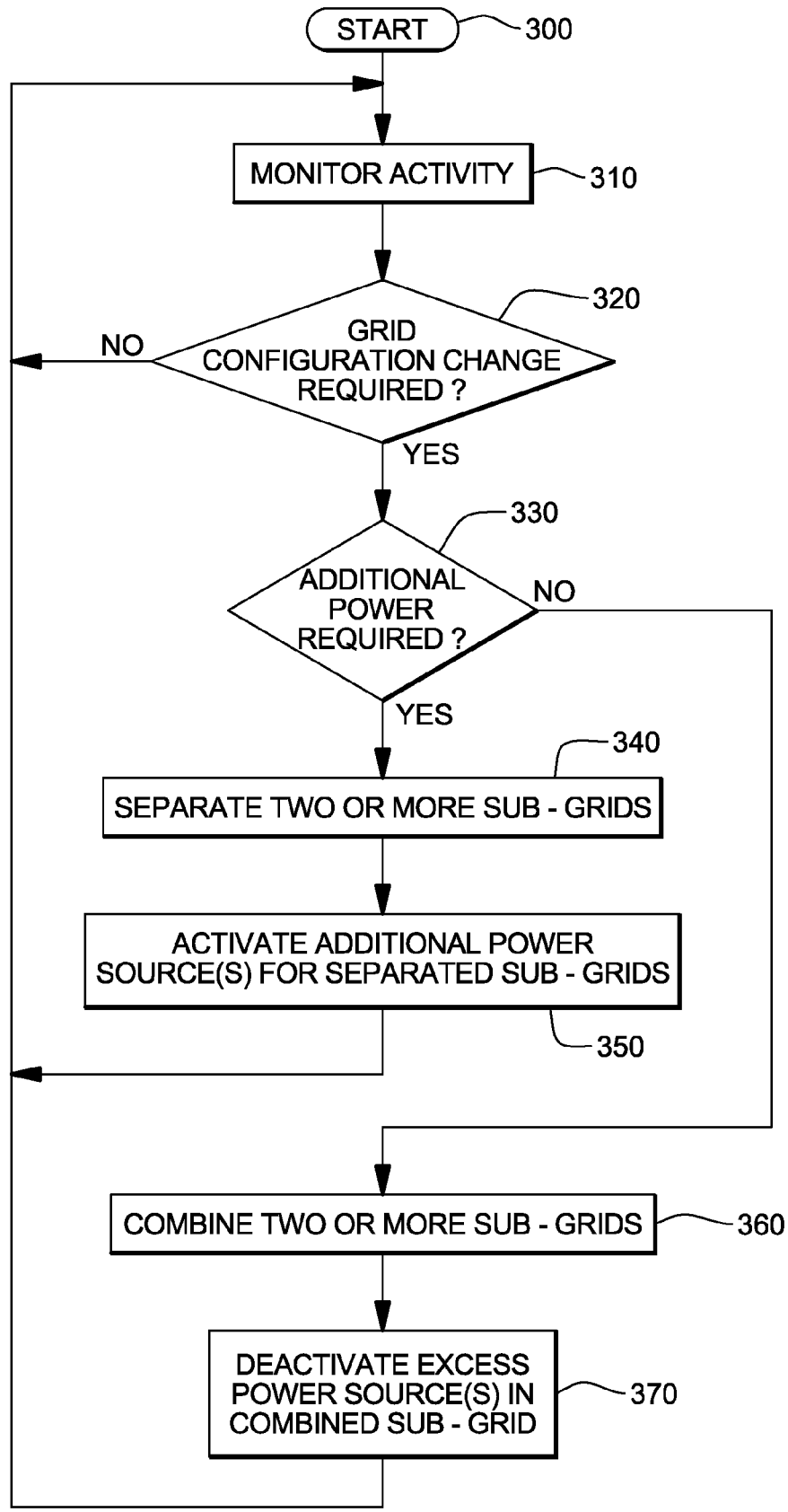
FIG. 3 depicts one embodiment of a process for controlling configuration of a power grid, in accordance with an aspect of the present invention.

FIG. 3 is a flowchart of one embodiment of processing implemented by a grid configuration control facility, in accordance with an aspect of the present invention. Control begins 300 with monitoring activity within a power grid comprising one or more stand-alone sub-grids 310. This monitoring includes monitoring power generation and monitoring load associated with the grid, which in one example, means monitoring the load and generated power of each stand-alone sub-grid. The controller determines whether a grid configuration change is desired or required 320, and if "no", continues to monitor activity within the power grid.

As used herein, a grid configuration change is deemed required if, for example, the monitored power generation and monitored power load utilization within one or more of the stand-alone sub-grids making up the power grid suggests that a grid configuration change is either required (for example, additional power needs to be generated) or is desirable (for example, to conserve fuel).

If a grid configuration change is required, then a determination is made whether additional power is required 330. If "yes", then a single stand-alone sub-grid is automatically separated into two or more stand-alone sub-grids 340, and additional power generators are automatically activated for the separated stand-alone sub-grids 350, without interrupting power to the load associated with the sub-grids of the power grid. By way of example, in the embodiment of FIG. 2, if the monitored load exceeds or is about to exceed a high power load threshold, then a controller implementing the grid configuration control facility may electrically open the relay in the grid connect unit to electrically isolate the two sub-grids' power loads and at the same time, automatically reactivate mobile power generator 111 to power the load of sub-grid 110'. In one implementation, mobile power generator 111 is activated in isolation from the power grid load of the sub-grid 110' and is automatically switched into the stand-alone sub-grid when the voltage frequency of the reactivated power generator is equal to the frequency of the power currently being supplied to the sub-grid by mobile power generator 111. This allows a seamless separation of the single stand-alone sub-grid into the first stand-alone sub-grid and the second stand-alone sub-grid, without interrupting power supply to any load within the sub-grids.

If additional power is not required, then the controller automatically electrically connects two or more stand-alone sub-grids into a single stand-alone sub-grid 360. Combining two or more stand-alone sub-grids into a single, stand-alone sub-grid assumes that the monitored load is below, for example, the low power load threshold (and, optimally, is projected to remain below the lower power load threshold for at least a defined time interval). Two or more stand-alone sub-grids may be automatically electrically connected into a single stand-alone sub-grid using a grid connect unit such as described above and monitoring the voltage frequencies of the individual stand-alone sub-grids. For example, the single stand-alone sub-grid may be formed when the monitored voltage frequencies within the first sub-grid and the second sub-grid are equal or substantially equal about a small range, for example, about 60 Hz, by automatically closing the power relay within the grid connect unit to complete the electrical connection between the power distribution units of the sub-grids, while at the same time automatically isolating one of the power generators, for example, the power generator of the first stand-alone sub-grid, and subsequently deactivating that power generator. Once two or more sub-grids are combined into a single, stand-alone sub-grid, then the one or more of the excess mobile power generators are automatically deactivated in the reconfigured, stand-alone sub-grid 370 to save fuel. After electrically separating a single stand-alone sub-grid into two or more stand-alone sub-grids, or after electrically connecting two or more stand-alone sub-grids into a single stand-alone sub-grid, the controller continues to monitor activity, that is, continues to monitor power load and power generation within the power grid to determine if one or more additional grid configuration changes are required.

An alternative approach to the processing outlined above is possible based, in one example, on software tools configured with a modeling and decision-making capability, and which automatically control the grid connect unit(s) at the appropriate time(s) to electrically connect or disconnect two or more stand-alone sub-grids, and which control activation or deactivation of one or more power generators within the power grid based, in part, on the electrical connection or disconnection of the sub-grids.

Figure 4A:
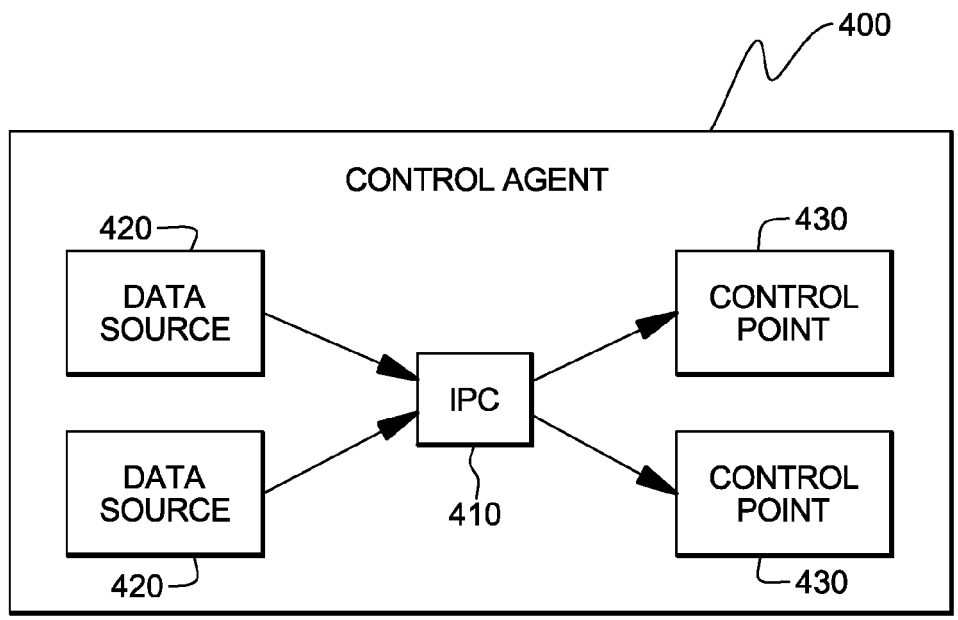
FIG. 4A depicts one embodiment of a control agent comprising an intelligent power controller (IPC), which is (in one implementation) an aspect of a grid configuration control facility distributively employed throughout the power grid, in accordance with an aspect of the present invention.
Figure 4B:
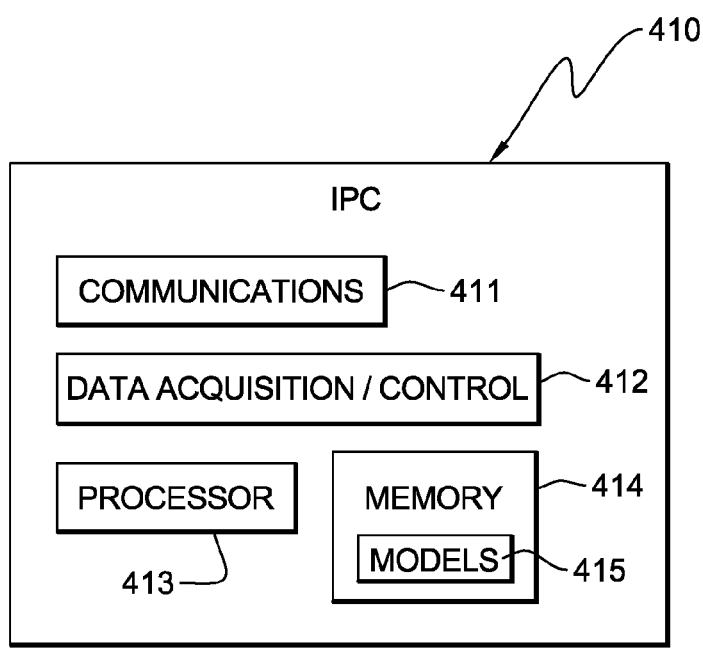
FIG. 4B depicts one embodiment of an intelligent power controller (IPC) which is distributed throughout the power grid, in one implementation of a grid configuration control facility, in accordance with an aspect of the present invention.

FIGS. 4A & 4B depict one embodiment of a control agent which may be employed in a distributed monitoring and control facility, in accordance with an aspect of the present invention. In FIG. 4A, control agent 400 is shown to include an intelligent power controller 410, which receives monitored data from data sources 420, and provides control signals to control points 430 within the power grid. FIG. 4B depicts one example of intelligent power controller (IPC) 410. In this embodiment, IPC 410 includes a communications interface 411 for facilitating communications with the data sources, control points and other IPCs (by way of example), and a data acquisition and control layer 412, both of which run via a processor 413 and its associated memory 414. As explained further below, multiple process models 415 may be created and maintained at the IPC.

Figure 5:
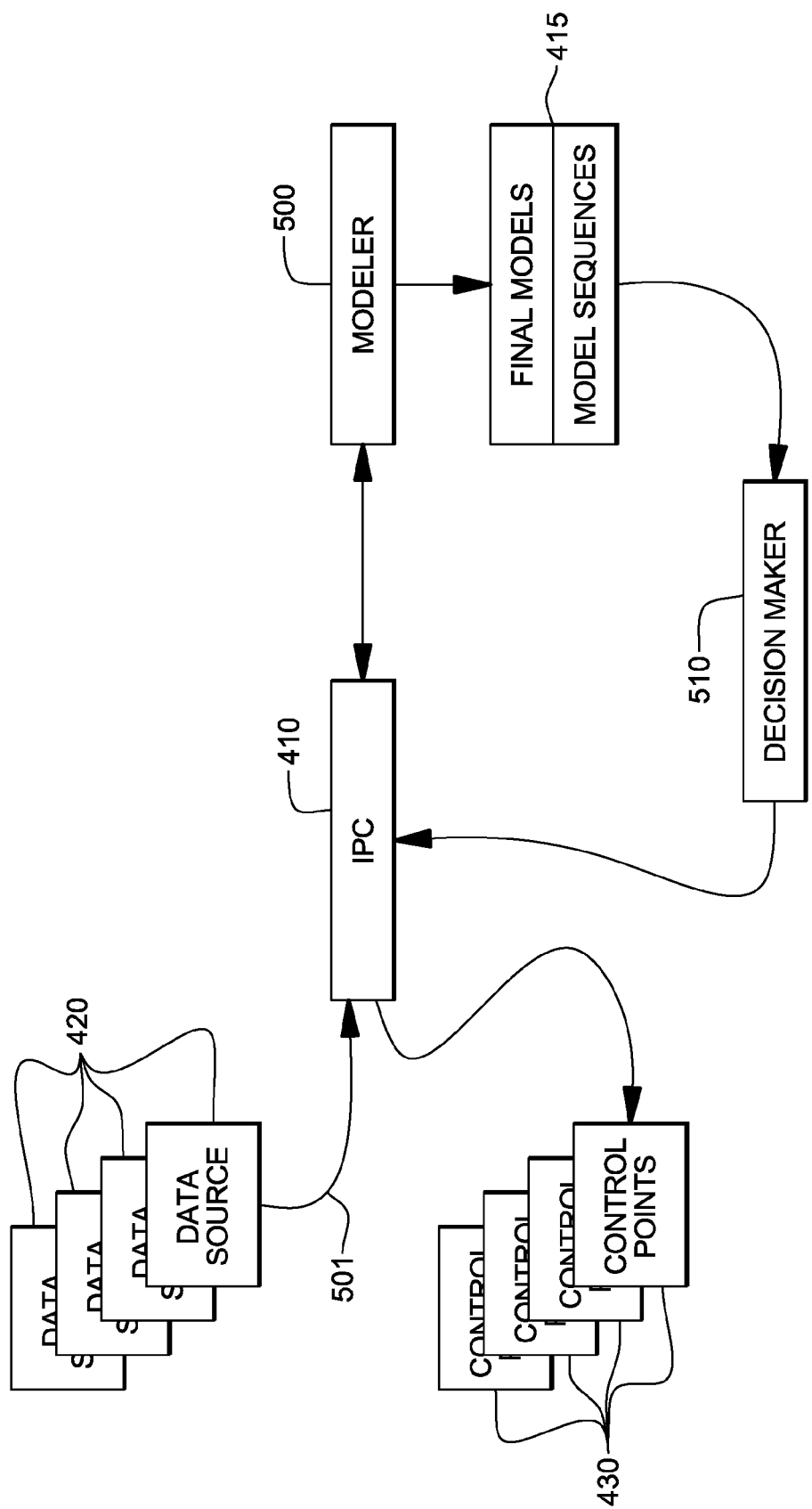
FIG. 5 is a more detailed illustration of one embodiment of a grid configuration control facility, in accordance with an aspect of the present invention.

In FIG. 5, IPC 410 of a single control agent is illustrated receiving data from multiple data sources 420 and providing signals to multiple control points 430. The data sources might comprise sources of characterizing attributes of, for example, a mobile power generator and the electricity loads within a sub-grid. This information is sent (by way of example) through a secure power line carrier connection 501 to the IPC 410. (Alternatively, a dedication information line could be used, such as an optical fiber, wire or other information carrier line.) IPC 410 manages both input data and output command signals, and makes these values available to other programs (e.g., other IPCs) in a consistent format, regardless of the data origin and control type. This is achieved, in part, by associating metadata with the incoming or outgoing datastreams, either at the IPC or at the data sources. The metadata may include information about the equipment, sensor, engineering units, and other aspects of a particular piece of data which could be employed by an automated monitoring and control facility such as the grid configuration control facility described herein.

Associating metadata with the datastreams facilitates the dynamic control of grid configuration. In one example, the datastreams include generators, loads and power flow controllers, which may include power distribution units, and any master or slave controllers. The datastreams may include timestamps, and the corresponding process values in appropriate engineering units. In one embodiment, the metadata includes the origin and process type resulting in the data. By way of specific example, the datastreams indicate the equipment of origin, location of the sensor on the equipment, engineering units, and original polling type, e.g., interrupt or interval. This information can be used in the development of models. Conceivably, knowing the type of equipment where the sensor is placed allows a model to be constructed with the appropriate inputs and outputs. The units allow for proper conversion between different models, and the polling type allows for a determination of whether the data is reported by exception or, alternatively, when the next data sample can be expected. It is expected that the sampling frequency can change depending upon conditions. A change in this value may dictate which models are used in an analysis.

As a specific example, assume the data source is a sensor associated with a generator. Then the data source might be related to, for example, fuel flow rate, power output, or current, voltage or power factor on one of a three-phase power signal output from the generator. Multiple data sources might be provided to ascertain each of these attributes for the generator, that is, in one example.

IPC 410 provides data to a modeler 500, which (in one embodiment) contains a library of user-defined templates that allow it to create process models of, for example, generator efficiency, the magnitude of electrical load as a function of time of day, etc., that can then be used to evaluate the effects of any number of potential control actions.

Modeler 500 operates (in one embodiment) by creating a large number of temporary process models and then determines which of these have valid input/output relationships. This can be done through standard statistical analyses. In one example, the modeler is part of the IPC and uses a standard back propagation neural network, such as can be found on many commercially available modelers. By way of example, reference the NetLab neural network software, provided by Neural Computing Research Group, Information Engineering, Aston University, Birmingham, United Kingdom. In another example, the modeler may implement a single or multi-variable regression approach.

Modeler 500 generates (in one implementation) both a series of final, valid models and chains of models 415 that describe a logical sequence of model outputs that may be used as inputs to other models. The models are essentially mappings of inputs to outputs. For example, a model could calculate the fuel consumption of a generator as a function of the generated electrical output and ambient temperature. Another model might predict the air-conditioning load on a circuit as a function of ambient conditions. These models are eventually used in "what-if" analysis performed by an optimization algorithm (i.e., the decision maker).

Figure 6:
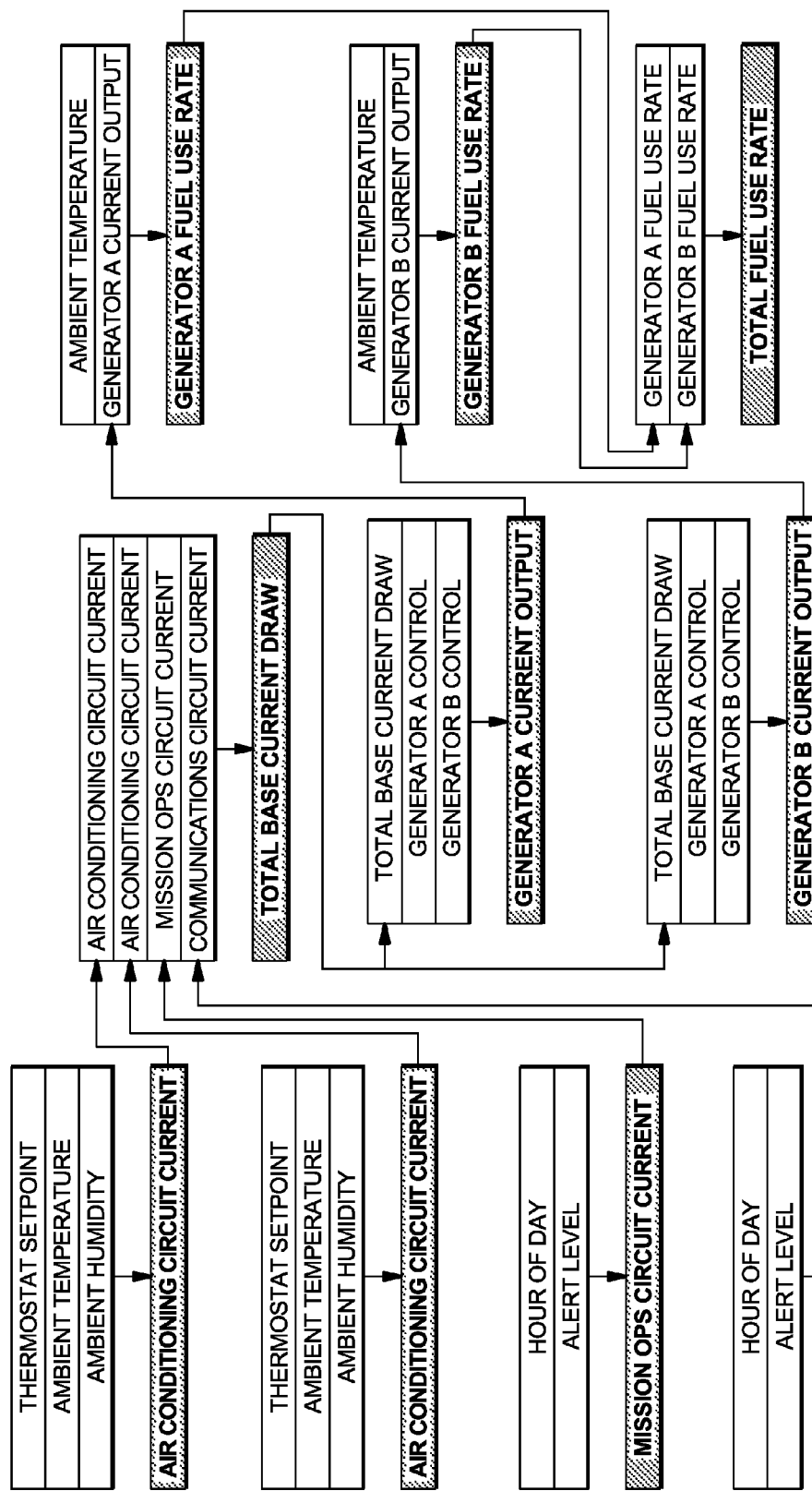
FIG. 6 is an example of monitored data being accumulated and modeled by one or more intelligent power controllers of a grid configuration control facility, in accordance with an aspect of the present invention.

FIG. 6 illustrates one example of models that rely on both monitored values and outputs from other models. The sequence here is used to predict the total fuel use of two generators, based on certain controlled variables (set points and generator control), uncontrolled variables (weather), and immutable variables (alert status). Such a chain of models is then used within a scheduling or optimization strategy to determine the effects of changing certain inputs on the outputs of the entire sequence. Multiple such sequences may be developed that use the same models (or a subset thereof) to identify a cause-and-effect relationship for other outputs. Predictors may be used to estimate the output of a given process based on proposed inputs. For example, predictors are used in FIG. 6 to estimate the generator fuel consumption. The predictors use the parameters created by the models for these predictions. These models are then used by a decision maker program 510 that uses both the current set of monitored values observed in the power sub-grids along with the models, which are effectively predictions on how the various grid components interact, to come up with an action plan. In one embodiment, the decision maker 510 attempts to minimize a cost function based on both the fuel consumption of the generators and the need to keep power supplied to key loads in the power sub-grids. Once a particular matrix of control actions is decided upon, the recommended command signals are sent back to the IPC 410 which, in turn, converts the recommendations to the proper command signals and sends the commands to the controllers on each piece of affected equipment 430. As one example, the distributed controllers may comprise distributed IPCs (or control agents) on various selected components within each sub-grid, with the decision maker 510 being an elected IPC 410 of a plurality of distributed IPCs 410 within the sub-grid, or more generally, within the power grid. By way of example, the decision maker can be selected by the IPCs at initialization time, for example, using their IP addresses.

By way of example, the command signals can be indications as to whether or not a generator within a sub-grid should turn on, or if a load should be curtailed, or if one or more grid connect units should couple or de-couple selected sub-grids.

Figure 7:
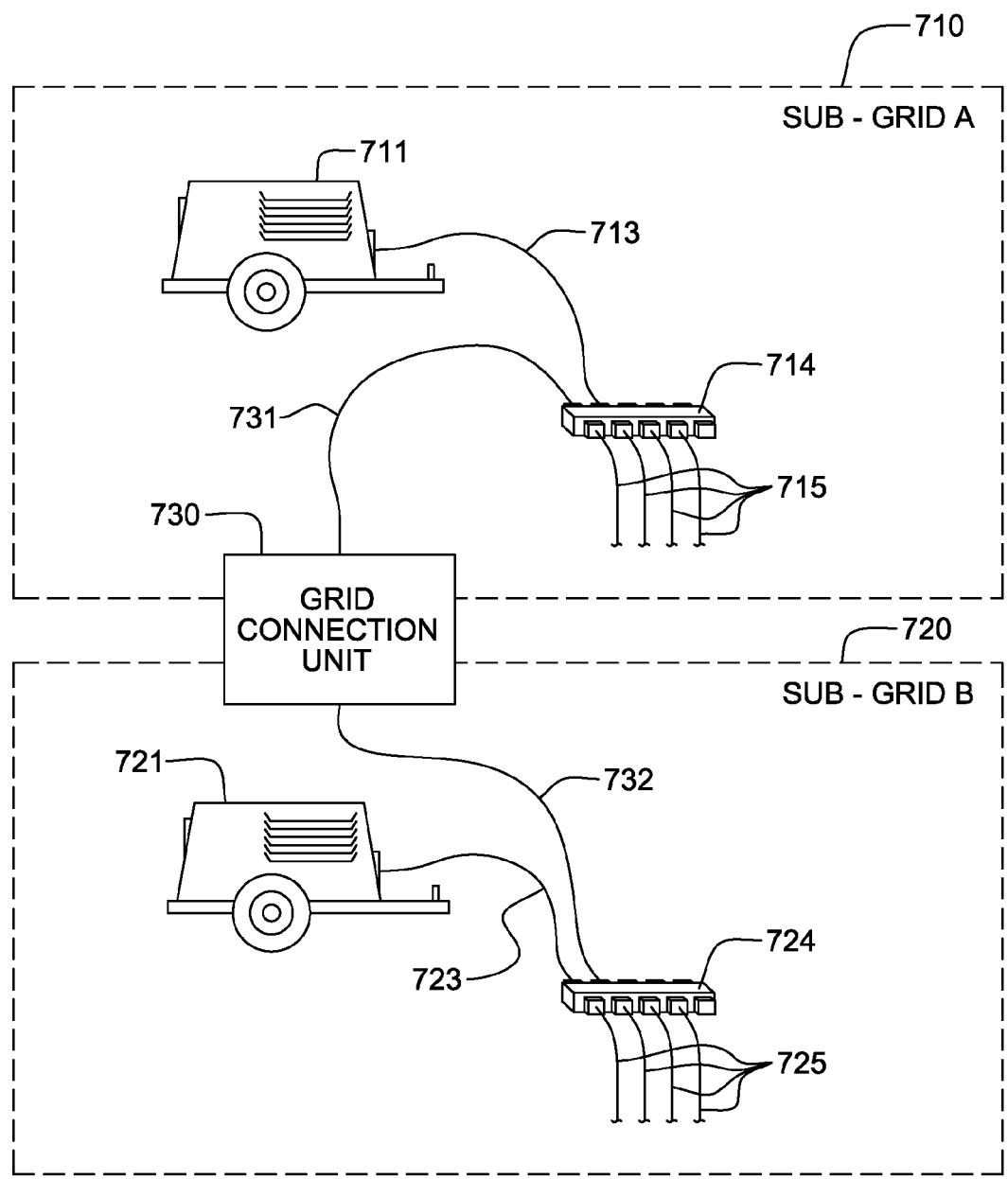
FIG. 7 illustrates an alternate embodiment of a power grid and grid configuration control facility, in accordance with an aspect of the present invention.

As a further variation, FIG. 7 illustrates a standard legacy generator 711 (in sub-grid A 710) and a newer, digitally controlled generator 721 (in sub-grid B 720) which provide power through main supply feeders 713, 723, respectively, to power distribution units 714, 724. Power distribution units 714, 724 in turn provide power to the individual plug loads 715, 725. A Grid Connect Unit (GCU) 730 incorporates a power relay which connects the power lines 731, 732 when closed and hence, connects the power distribution units. When instructed to connect the grids, GCU 730 uses a voltage comparison relay to measure when the two disconnected grids drift into phase (per beat frequency). Once the voltage difference is below a safe threshold, the relay closes and enables the connection. The GCU 730 also sends a message to disconnect the digitally controlled generator 721, which would (in one example) shut down approximately 1.5 seconds later. Further, if desired, the connection of the grids could be verified prior to turning the generator off. In the case of a power grid disconnection, the GCU 730 waits for a message from the digital generator that it is operational and connected before disconnecting the two sub-grids.

Those skilled in the art should note that also incorporated into the grid configuration control facility described herein would be appropriate safety mechanisms and message handshaking to protect operators, loads and power generation equipment from overloads and feedback. As will be apparent to one of ordinary skill in the art from the above description, a configuration control approach is described herein which guarantees sufficient power generation capacity among the grids or sub-grids to avoid, for example, any over-current shut-down, or similar power trip event on the generator(s). Reconfiguration of a grid or sub-grid could alternatively be accomplished by shedding power demand of the load on the grid or sub-grid, such that the total electrical load demand does not exceed available generation capacity, thus also preventing a trip relay and grid shut-down.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 8:
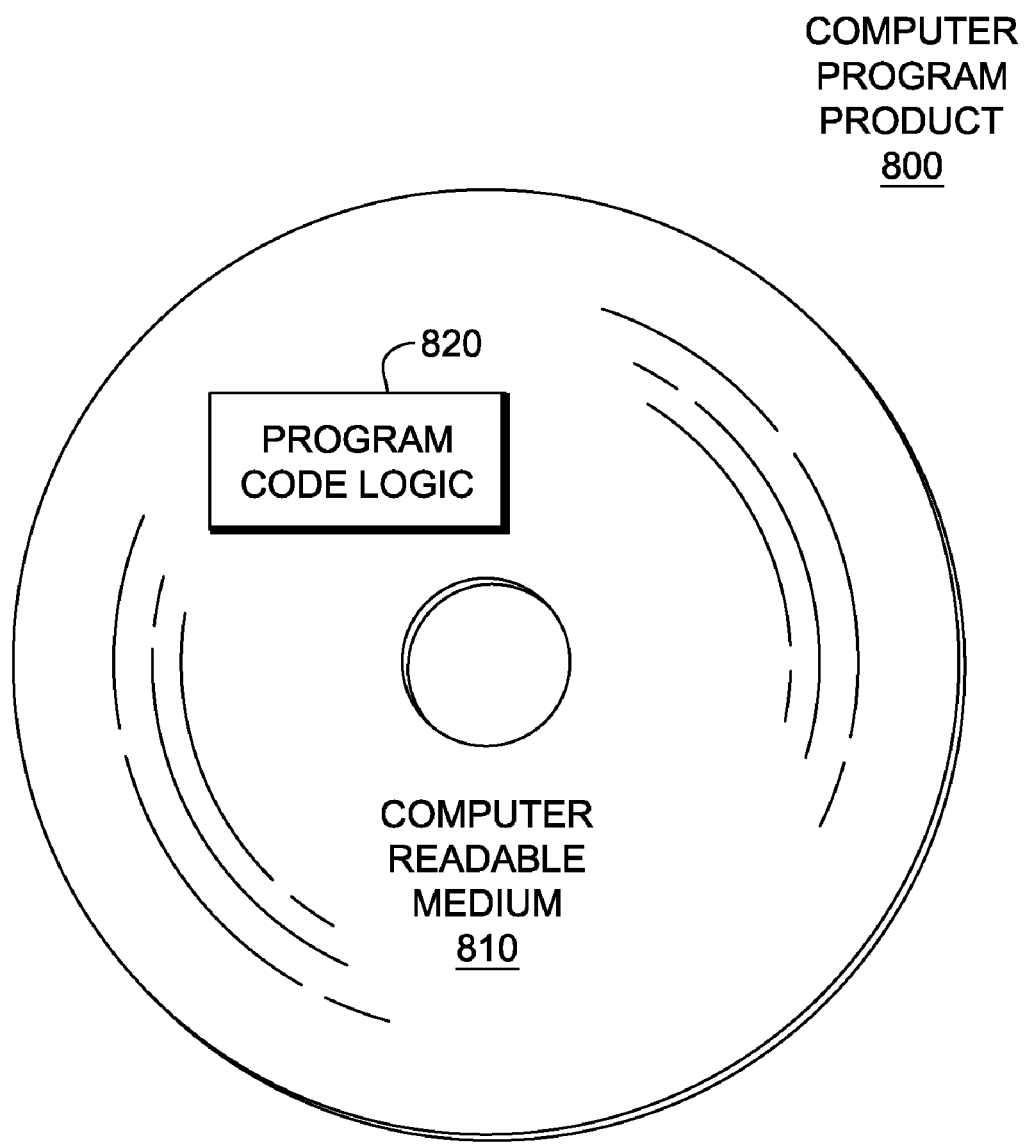
FIG. 8 depicts one embodiment of a computer program product incorporating one or more aspects of the present invention.

Referring now to FIG. 8, in one example, a computer program product 800 includes, for instance, one or more computer readable media 810 to store computer readable program code means or logic 820 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A method of controlling configuration of a power grid, the method comprising:
    automatically monitoring the power grid, wherein the power grid comprises at least one stand-alone sub-grid, each stand-alone sub-grid comprising a power generator, and wherein the automatically monitoring comprises automatically monitoring power demand of a load associated with the at least one stand-alone sub-grid and power generated by the power generator within each stand-alone sub-grid;
    automatically determining that a grid configuration change is required for the power grid based on the monitoring; and
    dynamically reconfiguring the power grid by automatically modifying one or more stand-alone sub-grids of the at least one stand-alone sub-grid in the power grid without interrupting power to the load associated with the at least one stand-alone sub-grid of the power grid and without shedding the load from the power grid.

2. The method of claim 1, wherein the monitored power grid comprises multiple stand-alone sub-grids, and the dynamically reconfiguring comprises automatically electrically connecting a first stand-alone sub-grid and a second stand-alone sub-grid of the multiple stand-alone sub-grids into a single stand-alone sub-grid and automatically deactivating at least one power generator powering one of the first stand-alone sub-grid or the second stand-alone sub-grid without interrupting power to the single stand-alone sub-grid.

3. The method of claim 2, wherein the automatically electrically connecting comprises automatically electrically connecting the first stand-alone sub-grid and the second stand-alone sub-grid when load associated with at least one of the first stand-alone sub-grid or the second stand-alone sub-grid is below a low power load threshold.

4. The method of claim 2, wherein the automatically electrically connecting comprises employing a grid connect unit electrically connected to the first stand-alone sub-grid and the second stand-alone sub-grid in automatically electrically connecting the first stand-alone sub-grid and the second stand-alone sub-grid into the single stand-alone sub-grid when load associated with at least one of the first stand-alone sub-grid or the second stand-alone sub-grid is below a low power load threshold, wherein the grid connect unit comprises a power relay, which when closed, electrically connects the first stand-alone sub-grid and the second stand-alone sub-grid.

5. The method of claim 2, wherein the automatically electrically connecting further comprises monitoring voltage frequencies within the first stand-alone sub-grid and the second stand-alone sub-grid and automatically electrically connecting the first stand-alone sub-grid and the second stand-alone sub-grid into the single stand-alone sub-grid when the monitored voltage frequencies of the first stand-alone sub-grid and the second stand-alone sub-grid are in phase.

6. The method of claim 1, wherein the dynamically reconfiguring comprises, without interrupting power, automatically electrically separating a single stand-alone sub-grid of the at least one stand-alone sub-grid into a first stand-alone sub-grid and a second stand-alone sub-grid and automatically activating a power generator for one of the first stand-alone sub-grid or the second stand-alone sub-grid without interrupting power to the first stand-alone sub-grid or the second stand-alone sub-grid.

7. The method of claim 6, wherein the automatically electrically separating comprises automatically, electrically separating the single stand-alone sub-grid into the first stand-alone sub-grid and the second stand-alone sub-grid when load associated with the single stand-alone sub-grid is above a high power load threshold of the single stand-alone sub-grid or the load associated with the single stand-alone sub-grid is dynamically projected to be above the high power load threshold of the single stand-alone sub-grid.

8. The method of claim 6, wherein the automatically electrically separating comprises employing a grid connect unit electrically connected to the single stand-alone sub-grid in automatically electrically separating the single stand-alone sub-grid into the first stand-alone sub-grid and the second stand-alone sub-grid when load associated with the single stand-alone sub-grid is above a high power load threshold of the single stand-alone alone sub-grid or the load associated with the single stand-alone sub-grid is dynamically projected to be above the high power load threshold of the single stand-alone sub-grid, wherein the grid connect unit comprises a power relay, which when opened, in combination with the automatically activating of the power generator, electrically separates the single stand-alone sub-grid into the first stand-alone sub-grid and the second stand-alone sub-grid.

9. The method of claim 1, wherein the power grid is a mobile power grid, and the power generator of each stand-alone sub-grid is a portable power generator, and wherein each stand-alone sub-grid further comprises a respective power load.

10. A method of controlling configuration of a power grid, the method comprising:
    automatically monitoring the power grid, wherein the power grid comprises at least one stand-alone sub-grid, each stand-alone sub-grid comprising a power generator, and wherein the automatically monitoring comprises automatically monitoring power demand of a load associated with the at least one stand-alone sub-grid and power generated by the power generator within each stand-alone sub-grid;

automatically determining that a grid configuration change is required for the power grid based on the monitoring;

automatically electrically connecting a first stand-alone sub-grid and a second stand-alone sub-grid of the at least one stand-alone sub-grid into a single stand-alone sub-grid and automatically deactivating at least one power generator of the first stand-alone sub-grid or the second stand-alone sub-grid, the automatically electrically connecting being responsive to the monitored load being below a low power load threshold and occurring without interrupting power to the load associated with the at least one stand-alone sub-grid of the power grid; and automatically electrically separating a single stand-alone sub-grid of the at least one stand-alone sub-grid into the first stand-alone sub-grid and the second stand-alone sub-grid and automatically activating at least one additional power generator to power one of the first stand-alone sub-grid or the second stand-alone sub-grid, the automatically electrically separating being responsive to the monitored load being or dynamically projected to be above a high power load threshold, and occurring without interrupting power to the load associated with the at least one stand-alone sub-grid of the power grid.

11. A system for controlling configuration of a power grid, the system comprising:

a memory; and a processor in communications with the memory, wherein the system is capable of performing a method, the method comprising:

automatically monitoring the power grid, wherein the power grid comprises at least one stand-alone sub-grid, each stand-alone sub-grid comprising a power generator, and wherein the automatically monitoring comprises automatically monitoring power demand of a load associated with the at least one stand-alone sub-grid and power generated by the power generator within each stand-alone sub-grid;

automatically determining that a grid configuration change is required for the power grid based on the monitoring; and dynamically reconfiguring the power grid by automatically modifying one or more stand-alone sub-grids of the at least one stand-alone sub-grid in the power grid without interrupting power to the load associated with the at least one stand-alone sub-grid of the power grid and without shedding the load from the power grid.

12. The system of claim 11, wherein the monitored power grid comprises multiple stand-alone sub-grids, and the dynamically reconfiguring comprises automatically electrically connecting a first stand-alone sub-grid and a second stand-alone sub-grid of the multiple stand-alone sub-grids into a single stand-alone sub-grid, and automatically deactivating at least one power generator powering one of the first stand-alone sub-grid or the second stand-alone sub-grid without interrupting power to the single stand-alone sub-grid, and wherein the automatically electrically connecting comprises automatically electrically connecting the first stand-alone sub-grid and the second stand-alone sub-grid when load associated with at least one of the first stand-alone sub-grid or the second stand-alone sub-grid is below a lower power load threshold.

13. The system of claim 12, wherein the automatically electrically connecting comprises employing a grid connect unit electrically connected to the first stand-alone sub-grid and the second stand-alone sub-grid in automatically electrically connecting the first stand-alone sub-grid and the second stand-alone sub-grid into the single stand-alone sub-grid when load associated with the at least one of the first stand-alone sub-grid or the second stand-alone sub-grid is below the low power load threshold, and wherein the grid connect unit comprises a power relay, which when closed, electrically connects the first stand-alone sub-grid and the second stand-alone sub-grid.

14. The system of claim 12, wherein the automatically electrically connecting further comprises monitoring voltage frequencies within the first stand-alone sub-grid and the second stand-alone sub-grid and automatically electrically connecting the first stand-alone sub-grid and the second stand-alone sub-grid into the single stand-alone sub-grid when the monitored voltage frequencies of the first stand-alone sub-grid and the second stand-alone sub-grid grid are in phase.

15. The system of claim 11, wherein the dynamically reconfiguring comprises, without interrupting power, automatically electrically separating a single stand-alone sub-grid of the at least one stand-alone sub-grid into a first stand-alone sub-grid and a second stand-alone sub-grid, and automatically activating a power generator for one of the first stand-alone sub-grid or the second stand-alone sub-grid without interrupting power to the first stand-alone sub-grid or the second stand-alone sub-grid, and wherein the automatically electrically separating comprises automatically electrically separating the single stand-alone sub-grid into the first stand-alone sub-grid and the second stand-alone sub-grid when power load associated with the single stand-alone sub-grid is above a high power load threshold of the single stand-alone sub-grid or the load associated with the single stand-along sub-grid is dynamically projected to be above the high power load threshold of the single stand-alone sub-grid.

16. The system of claim 15, wherein the automatically electrically separating comprises employing a grid connect unit electrically connected to the single stand-alone sub-grid in automatically electrically separating the single stand-alone sub-grid grid into the first stand-alone sub-grid and the second stand-alone sub-grid when load associated with the single stand-alone sub-grid is above the high power load threshold of the single stand-alone sub-grid or the load associated with the single stand-alone sub-grid is dynamically projected to be above the high power load threshold of the single stand-alone sub-grid, wherein the grid connect unit comprises a power relay, which when opened, in combination with the automatically activating of the power generator, electrically separates the single stand-alone sub-grid into the first stand-alone sub-grid and the second stand-alone sub-grid.

17. The system of claim 11, wherein the power grid is a mobile power grid, and the power generator of each stand-alone sub-grid is a portable power generator, and wherein each stand-alone sub-grid further comprises a respective load.

18. A computer program product for controlling configuration of a power grid, the computer program product comprising:

a storage medium readable by a processing circuit and storing instructions for execution by the processing circuit for performing a method comprising:

automatically monitoring the power grid, wherein the power grid comprises at least one stand-alone sub-grid, each stand-alone sub-grid comprising a power generator, and wherein the automatically monitoring comprises automatically monitoring power demand of a load associated with the at least one stand-alone sub-grid and power generated by the power generator within each stand-alone sub-grid;

automatically determining a grid configuration change is required for the power grid based on the monitoring; and dynamically reconfiguring the power grid by automatically modifying one or more stand-alone sub-grids of the at least one stand-alone sub-grid in the power grid without interrupting power to the load associated with the at least one stand-alone sub-grid of the power grid and without shedding the load from the power grid.

19. The computer program product of claim 18, wherein the monitored power grid comprises multiple stand-alone sub-grids, and the dynamically reconfiguring comprises automatically electrically connecting a first stand-alone sub-grid and a second stand-alone sub-grid of the multiple stand-alone sub-grids into a single stand-alone sub-grid, and automatically deactivating at least one power generator powering one of the first stand-alone sub-grid or the second stand-alone sub-grid without interrupting power to the single stand-alone sub-grid, and wherein the automatically electrically connecting comprises automatically electrically connecting the first stand-alone sub-grid and the second stand-alone sub-grid when power load associated with at least one of the first stand-alone sub-grid or the second stand-alone sub-grid is below a lower power load threshold.

20. The computer program product of claim 18, wherein the dynamically reconfiguring comprises, without interrupting power, automatically electrically separating a single stand-alone sub-grid of the at least one stand-alone sub-grid into a first stand-alone sub-grid and a second stand-alone sub-grid, and automatically activating a power generator for one of the first stand-alone sub-grid or the second stand-alone sub-grid without interrupting power to the first stand-alone sub-grid or the second stand-alone sub-grid, and wherein the automatically electrically separating comprises automatically electrically separating the single stand-alone sub-grid into the first stand-alone sub-grid and the second stand-alone sub-grid when load associated with the single stand-alone sub-grid is above a high power load threshold of the single stand-alone sub-grid or the load associated with the single stand-alone sub-grid is dynamically projected to be above the high power load threshold of the single stand-alone sub-grid.

21. A method of deploying power grid configuration control logic on one or more processing units, the method comprising:

installing power grid configuration control logic on at least one processing unit, the power grid configuration control logic to:

automatically monitor the power grid, wherein the power grid comprises at least one stand-alone sub-grid, each stand-alone sub-grid comprising a power generator, and wherein the automatic monitoring comprises automatically monitoring power demand of a load associated with the at least one stand-alone sub-grid and power generated by the power generator within each stand-alone sub-grid;

automatically determine that a grid configuration change is required for the power grid based on the monitoring; and dynamically reconfigure the power grid by automatically modifying one or more stand-alone sub-grids of the at least one stand-alone sub-grid in the power grid without interrupting power to the load associated with the at least one stand-alone sub-grid of the power grid and without shedding the load from the power grid.

* * * * *